US009224286B2

(12) United States Patent
Shapiro et al.

(10) Patent No.: US 9,224,286 B2
(45) Date of Patent: Dec. 29, 2015

(54) SECURITY SYSTEM HEALTH MONITORING

(71) Applicant: ADT US HOLDINGS, INC., Boca Raton, FL (US)

(72) Inventors: Steven Shapiro, Lake Worth, FL (US); Raymond North, Boca Raton, FL (US); Timothy Albert Rader, Lake Worth, FL (US); Jorge Perdomo, Boca Raton, FL (US); Anne-Marie Rouse, Wellington, FL (US); James Timothy Black, Delray Beach, FL (US)

(73) Assignee: ADT US HOLDINGS, INC., Boca Raton, FL (US)

( * ) Notice: Subject to any disclaimer, the term of this patent is extended or adjusted under 35 U.S.C. 154(b) by 97 days.

(21) Appl. No.: 14/214,353

(22) Filed: Mar. 14, 2014

(65) Prior Publication Data
US 2014/0266678 A1    Sep. 18, 2014

Related U.S. Application Data

(60) Provisional application No. 61/788,924, filed on Mar. 15, 2013.

(51) Int. Cl.
*G08B 29/00* (2006.01)
*G08B 29/14* (2006.01)
(Continued)

(52) U.S. Cl.
CPC .............. *G08B 29/14* (2013.01); *G05B 23/0232* (2013.01); *G05B 23/0235* (2013.01); *G05B 23/0272* (2013.01); *G05B 23/0283* (2013.01); *G06F 1/30* (2013.01); *G06F 1/3234* (2013.01)

(58) Field of Classification Search
CPC .............. G08B 29/14; G05B 23/0232; G05B 23/0235; G05B 23/0272; G05B 23/0283; G06F 1/30; G06F 1/32
USPC ................... 340/514, 521, 506, 500, 540, 541
See application file for complete search history.

(56) References Cited

U.S. PATENT DOCUMENTS 7,088,255 B2 *   8/2006   Ridolfo et al. ................. 340/635
7,158,022 B2 *   1/2007   Fallon ........................... 340/506
(Continued)

FOREIGN PATENT DOCUMENTS

EP      1967922 A2     9/2008
WO  2006/133090 A1   12/2006
WO  2013/019659 A1    2/2013

OTHER PUBLICATIONS

International Search Report and Written Opinion dated Jul. 31, 2014 for International Application Serial No. PCT/US2014/029709, International Filing Date: Mar. 14, 2014, consisting of 9 pages.

*Primary Examiner* — Eric M Blount
(74) *Attorney, Agent, or Firm* — Christopher & Weisberg, P.A.

(57) ABSTRACT

An apparatus and method for determining at least one operational condition of a premises based system including at least one premises device. The apparatus includes a processor configured to perform a diagnostic procedure. The diagnostic procedure includes determining operational data of the premises based system, the operational data indicating at least one of a premises device and the apparatus is operating outside a failure range and performing predictive analysis based at least in part on the received operational data. The predictive analysis indicates whether the at least one of premises device and apparatus is likely to operate within the failure range within a predefined period of time. The diagnostic procedure includes causing a notification alert to be transmitted to at least one of a user interface device and remote monitoring center based on the predictive analysis.

24 Claims, 9 Drawing Sheets

(51) Int. Cl.
  *G05B 23/02* (2006.01)
  *G06F 1/30* (2006.01)
  *G06F 1/32* (2006.01)

(56) References Cited

U.S. PATENT DOCUMENTS

| | | | |
|---|---|---|---|
| 8,665,084 B2 * | 3/2014 | Shapiro et al. | 340/539.1 |
| 8,688,405 B2 * | 4/2014 | Cottrell et al. | 702/188 |
| 2005/0179537 A1 * | 8/2005 | Lewis | 340/506 |
| 2006/0087428 A1 * | 4/2006 | Wolfe et al. | 340/539.22 |
| 2006/0217822 A1 * | 9/2006 | Ramanathan et al. | 700/83 |
| 2007/0040449 A1 * | 2/2007 | Spurlin et al. | 307/64 |
| 2008/0109185 A1 * | 5/2008 | Cheung et al. | 702/184 |
| 2010/0102948 A1 * | 4/2010 | Grohman et al. | 340/506 |
| 2013/0002424 A1 * | 1/2013 | Haynes | 340/540 |
| 2014/0074409 A1 * | 3/2014 | Boyd et al. | 702/35 |

* cited by examiner

SECURITY SYSTEM HEALTH MONITORING

CROSS-REFERENCE TO RELATED APPLICATION

This application is related to and claims priority to U.S. Provisional Patent Application Ser. No. 61/788,924, filed Mar. 15, 2013, entitled "SECURITY SYSTEM HEALTH MONITORING", the entirety of which is incorporated herein by reference.

FIELD OF THE INVENTION

The invention relates to premises-based systems that centrally control a plurality of separate devices, and in particular to monitoring health of the premises-based system to confirm operation.

BACKGROUND OF THE INVENTION

The demand for systems that use a variety of devices at a location to monitor a variety of conditions, such as monitoring homes and businesses for alarm conditions, allowing users to centrally control various devices (such as thermostats, switches, cameras, appliances, etc.), monitor medical conditions, and the like has continued to grow as more home and business owners seek better control over their premises and to protect it from various hazards and threats. Such hazards and threats include intrusion, fire, carbon monoxide and flooding, among others dangers that may be monitored and reported to a monitoring station.

Conventional systems typically employ a control panel and/or gateway that receive "event" (such as triggering alarms) and other information from various sensors and devices, and is used to operate them. This may be done locally by the user, or remotely via a monitoring center. In the case of alarm events, the monitoring center can also take appropriate action, such as notifying emergency responders. Installation and servicing complexity associated with these systems tends to be high, as an installer has to physically position, mount, and configure the control panel and all of the various sensors, while taking into account a variety of performance characteristics and requirements for each device to ensure proper operation of the system. These systems also typically incorporate a manufacturer's specific technology designed for the manufacturer's security application, and only certain devices may only appropriately interoperate with other devices in certain ways. This is true as well for more recent all-in-one (AIO) security systems, in which the control panel and a user interface (such as a keypad) are combined in a single unit, even portable AIO systems where the control panel may be relocated around the premises and not permanently installed. For example, such units may sit on top of a table or on the floor, but nevertheless communicates with life safety sensors in a similar manner as a wall-mounted security panel.

However, these existing security systems suffer from the same problem, namely, a lack of health monitoring of the security system. In particular, these existing security systems only generate a system alert when the health levels of sensors or components fall below predefined minimum thresholds. For example, a battery alert for a sensor will only trigger an alert when the battery is falls below an operational threshold, but this operational threshold typically corresponds to a battery level of where the sensor or component is forced to turn off or will turn off shortly. In other words, health level thresholds in existing systems are only triggered when the levels are so bad such that at least one sensor or component of the system stops functioning properly.

Further, customers have no way of knowing when the heath levels of their security systems are going to degrade to the point that functionality, i.e., monitoring capabilities, of the security system are affected. Such a failure may come at an inopportune time such as when the customer is on vacation or otherwise away from the premise. Therefore, the user is not able to fix the problem, e.g., change batteries, or call for a service technician because the customer may not even know a problem exist until the customer returns to the premise. Such a sudden failure in monitoring capabilities of these existing security systems may inadvertently provide thieves the window of opportunity they have been waiting for.

SUMMARY OF THE INVENTION

The invention advantageously provides a method and system for premises-based systems that centrally control a plurality of separate devices, and in particular to monitor health of the premises-based system to confirm operation.

According to one embodiment, an apparatus for determining at least one operational condition of a premises based system including at least one premises device. The apparatus includes a processor configured to perform a diagnostic procedure. The diagnostic procedure includes determining operational data of the premises based system, the operational data indicating at least one of a premises device and the apparatus is operating outside a failure range and performing predictive analysis based at least in part on the received operational data. The predictive analysis indicates whether the at least one of premises device and apparatus is likely to operate within the failure range within a predefined period of time. The diagnostic procedure includes causing a notification alert to be transmitted to at least one of a user interface device and remote monitoring center based on the predictive analysis.

In one embodiment of this aspect, the failure range of the at least one premises device and apparatus includes one of a battery level range, radio frequency signal level range and received signal level range. In another embodiment of this aspect, the processor is further configured to modify at least one setting of the at least one premises device and apparatus if the predictive analysis indicates the at least one premises device and apparatus is likely to operate within the failure range within the predefined period of time. In one embodiment of this aspect, the at least one premises device is a sensor device. The modifying at least one setting causing the sensor to operate at a lower detection rate. In one embodiment of this aspect, operational data includes at least one of an alternating current power level, Wi-Fi signal strength level, received signal strength level and battery level.

In one embodiment of this aspect, the predictive analysis is further based at least in part on a history of received operational data. In one embodiment of this aspect, the apparatus is a control unit locatable at a premises of a user. In one embodiment of this aspect, the processor is further configured to determine at least one behavioral characteristic of the premises based system and initiate the diagnostic procedure if the at least one average behavioral characteristic of the premises based system is not met. In another embodiment of this aspect, the at least one behavioral characteristic of the premises based system indicates a window of time when the premises based system is armed by a user. In another embodiment of this aspect, if the premises device is a life safety device, the notification alert being transmitted to the at least the remote monitoring center and the user interface device. If the premises device is a lifestyle device, the notification alert being transmitted to the user interface device.

According to another embodiment, a method for determining at least one operational condition of a premises based system including at least one premises device is provided. Operational data of the premises based system is determined. The operational data indicates at least one of a premises device and the apparatus is operating outside a failure range. Predictive analysis is performed based at least in part on the received operational data. The predictive analysis indicates whether the at least one of premises device and apparatus is likely to operate within the failure range within a predefined period of time. A notification alert is caused to be transmitted to at least one of a user interface device and remote monitoring center based on the predictive analysis.

In one embodiment of this aspect, the failure range of the at least one premises device and apparatus includes one of a battery level range, radio frequency signal level range and received signal level range. In another embodiment of this aspect, at least one setting of the at least one premises device and apparatus is modified if the predictive analysis indicates the at least one premises device and apparatus is likely to operate within the failure range within the predefined period of time. In another embodiment of this aspect, the at least one premises device is a sensor device. The modifying at least one setting causing the sensor to operate at a lower detection rate. In another embodiment of this aspect, operational data includes at least one of an alternating current power level, Wi-Fi signal strength level, received signal strength level and battery level. In another embodiment of this aspect, the predictive analysis is further based at least in part on a history of received operational data.

In another embodiment of this aspect, at least one behavioral characteristic of the premises based system is determined. The method is initiated if the at least one average behavioral characteristic of the premises based system is not met. In another embodiment of this aspect, the at least one behavioral characteristic of the premises based system indicates a window of time when the premises based system is armed by a user. In another embodiment of this aspect, if the premises device is a life safety device, the notification alert being transmitted to the at least the remote monitoring center and the user interface device. If the premises device is a lifestyle device, the notification alert being transmitted to the user interface device.

According to another embodiment of this aspect, an apparatus for determining at least one operational condition of a premises based system is provided. The premises based system includes at least one premises device. The apparatus includes a processor configured to perform a diagnostic procedure. The diagnostic procedure includes determining operational data of the premises system. The operational data indicates an operating level history of at least one of a premises device and the apparatus. The diagnostic procedure further includes performing predictive analysis based at least in part on the operational data. The predictive analysis indicates whether the at least one of premises device and apparatus is likely to operate within a failure range within a predefined period of time. The diagnostic procedure includes causing a notification alert to be transmitted to one of a user interface device and remote monitoring center based on the predictive analysis. The diagnostic procedure further includes modifying at least one setting of the at least one premises device and apparatus if the predictive analysis indicates the at least one premises device and apparatus is likely to operate within the failure range within the predefined period of time.

In one embodiment of this aspect, the failure range of the at least one premises device and apparatus includes one of a battery level range, radio frequency signal level range and received signal level range. In another embodiment of this aspect, the at least one premises device is a sensor device. The modifying of at least one setting causes the sensor to operate at a lower detection rate. In another embodiment of this aspect, the processor is further configured to determine at least one behavioral characteristic of the premises based system and initiate the diagnostic procedure if the at least one average behavioral characteristic of the premises based system is not met. In another embodiment of this aspect, the at least one behavioral characteristics of the premises based system indicates a window of time when the premises based system is armed by a user.

BRIEF DESCRIPTION OF THE DRAWINGS

A more complete understanding of the invention, and the attendant advantages and features thereof, will be more readily understood by reference to the following detailed description when considered in conjunction with the accompanying drawings wherein.

DETAILED DESCRIPTION OF THE INVENTION

Figure 1:
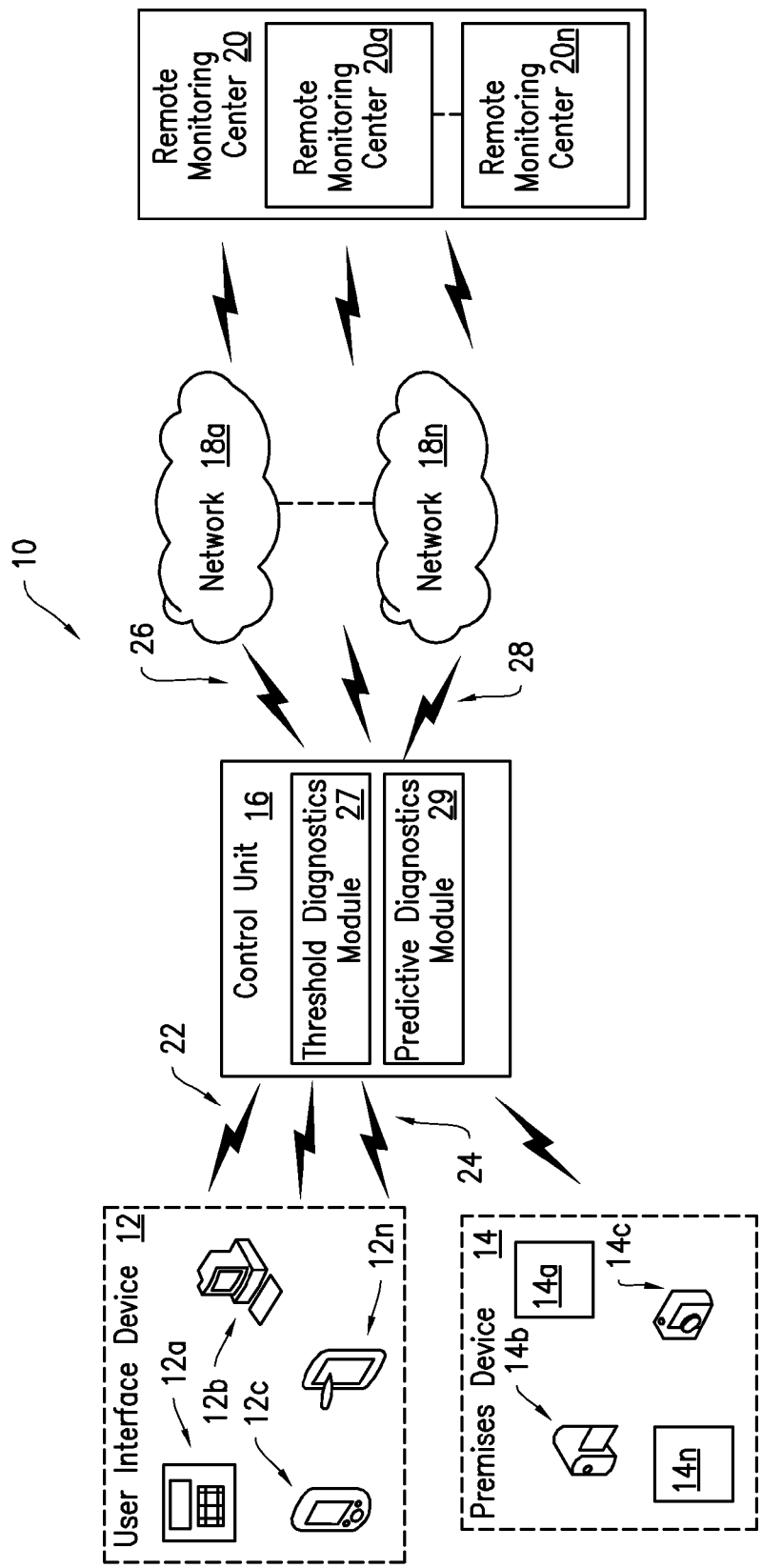
FIG. 1 is a block diagram of a premises based control system for premises based control management, constructed in accordance with the principles of the invention.

The invention advantageously provides a system, device and method for a premises based control system health management. Accordingly, the system, device and method components have been represented where appropriate by convention symbols in the drawings, showing only those specific details that are pertinent to understanding the embodiments of the invention so as not to obscure the disclosure with details that will be readily apparent to those of ordinary skill in the art having the benefit of the description herein. While the invention is described herein with respect to a security system, the invention is not limited to such. It is contemplated that the processes and functions described herein may be applied to any premises based system that centrally controls a plurality of separate devices.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements there is shown in FIG. 1 a premises based control system constructed in accordance with the principles of the invention and designated generally as "10." System 10 may include one or more user interface devices 12a to 12n (collectively referred to as "user interface device 12"), one or more premises devices 14a to 14n (collectively referred to as "premises device 14"), control unit 16, one or more networks 18a to 18n (collectively referred to as "network 18") and one or more remote monitoring centers 20a to 20n (collectively referred to as "remote monitoring center 20"), communicating with each other. In one embodiment, system 10 is a security control system and control unit 16 is a security control unit.

User interface device 12 may be a wireless device that allows a user to communicate with control unit 16. User interface device 12 may be a portable control keypad/interface 12a, computer 12b, mobile phone 12c and tablet 12n, among other devices that allow a user to interface with control unit 16. User interface device 12 may communicate at least with control unit 16 using one or more wireless communication protocols well known to those of ordinary skill in the art. For example, portable control keypad 12a may communicate with control unit 16 via a ZigBee based communication link 22, e.g., network based on Institute of Electrical and Electronics Engineers (IEEE) 802.15.4 protocols, and/or Z-wave based communication link 24, or over the premises' local area network, e.g., network based on Institute of Electrical and Electronics Engineers (IEEE) 802.11 protocols. Other communication protocols may be used and may be directional or bi-directional, and proprietary and not per any published standard. User interface device 12 is discussed in detail with respect to FIG. 3.

Premises devices 14 may include one or more types of sensors, control and/or image capture devices. For example, the types of sensors may include various life safety related sensors such as motion sensors, fire sensors, carbon monoxide sensors, flooding sensors and contact sensors, among other sensor types that are known in the art. The control devices may include, for example, one or more life style related devices configured to adjust at least one premises setting such as lighting, temperature, energy usage, door lock and power settings, among other settings associated with the premises or devices on the premises. Image capture devices may include a digital camera and/or video camera, among other image captures devices that are well known in the art. Premises device 14 may communicate with control unit 16 via proprietary wireless communication protocols and may also use Wi-Fi, both of which are known in the art. Those of ordinary skill in the art will also appreciate that various additional sensors and control and/or image capture devices may relate to life safety or life style depending on both what the sensors, control and image capture devices do and how these sensors, control and image devices are used by system 10. One of the advantages of the invention is the ability to use any of these devices irrespective of whether they are life safety or life style.

Control unit 16 may provide management functions such as power management, security system functions, premises device management and alarm management, among other functions. In particular, control unit 16 may manage one or more life safety and life style features. Life safety features may correspond to premises based system functions and settings associated with premises conditions that may result in life threatening harm to a person such as carbon monoxide detection and intrusion detection. Life style features may correspond to premises based system functions and settings associated with video capturing devices and non-life threatening conditions of the premises such as lighting and thermostat functions. Control unit 16 may include health module 17 that performs the diagnostic monitoring functions, discussed in detail below with respect to FIG. 7. Example control unit 16 components and functions are described detail with respect to FIG. 2.

Control unit 16 may communicate with network 18 via one or more communication links such as wireless or wireless communication links, e.g., Wi-Fi and/or other technologies. In particular, the communications links may be broadband communication links such as a wired cable modem or Ethernet communication link 26, and digital cellular communication link 28, e.g., long term evolution (LTE) based link, among other broadband communication links known in the art. Broadband as used herein may refer to a communication link other than a plain old telephone service (POTS) line. Ethernet communication link 26 may be an IEEE 802.3 based communication link. Network 18 may be a wide area network, local area network, wireless local network and metropolitan area network, among other networks known in the art. Network 18 provides communications between control unit 16 and remote monitoring center 20.

System 10 may include remote monitoring center 20 that is capable of performing monitoring, configuration and/or control functions associated with control unit 16. For example, remote monitoring center 20 may include a remote life safety monitoring center that monitors life safety features associated with control unit 16 in which the remote monitoring center 20 receives life safety data from control unit 16. For example, with respect to fire and carbon monoxide detectors/sensors, life safety data may include at least one carbon monoxide readings, smoke detection reading, sensor location and time of reading, among other related to these detectors that may be communicated with remote monitoring center 20. In yet another example, with respect to a door contact detector, life safety data may include at least one of sensor location and time of detection, among other data related to the door contact detection that may be communicated with remote monitoring center 20.

Alarm event data from the premises may be used by the remote monitoring center in running through various life safety response processes in notifying the owner of the premises, determining whether an actual alarm event is occurring at the premises, and notifying any appropriate response agency (e.g., police, fire, emergency response, premises owners, other interested parties, etc.).

The same or separate remote monitoring center 20 may also include a life style system/service that allows for various life style features associated with control unit 16. The remote life style system may receive life style data from control unit 16. For example, with respect to temperature control, life safety data may include thermostat readings. In yet another example, with respect to video capture devices, life style data may include at least one of captured images, video, time of video capture and video location, among other data related to video capture devices that may be communicate with remote monitoring center 20. Remote monitoring center 20 may also provide updates to control unit 16 such as updates to features associated with life safety and/or life style operating system.

Those of ordinary skill in the art will appreciate that video and other data may also be used by the life safety monitoring center.

Figure 2:
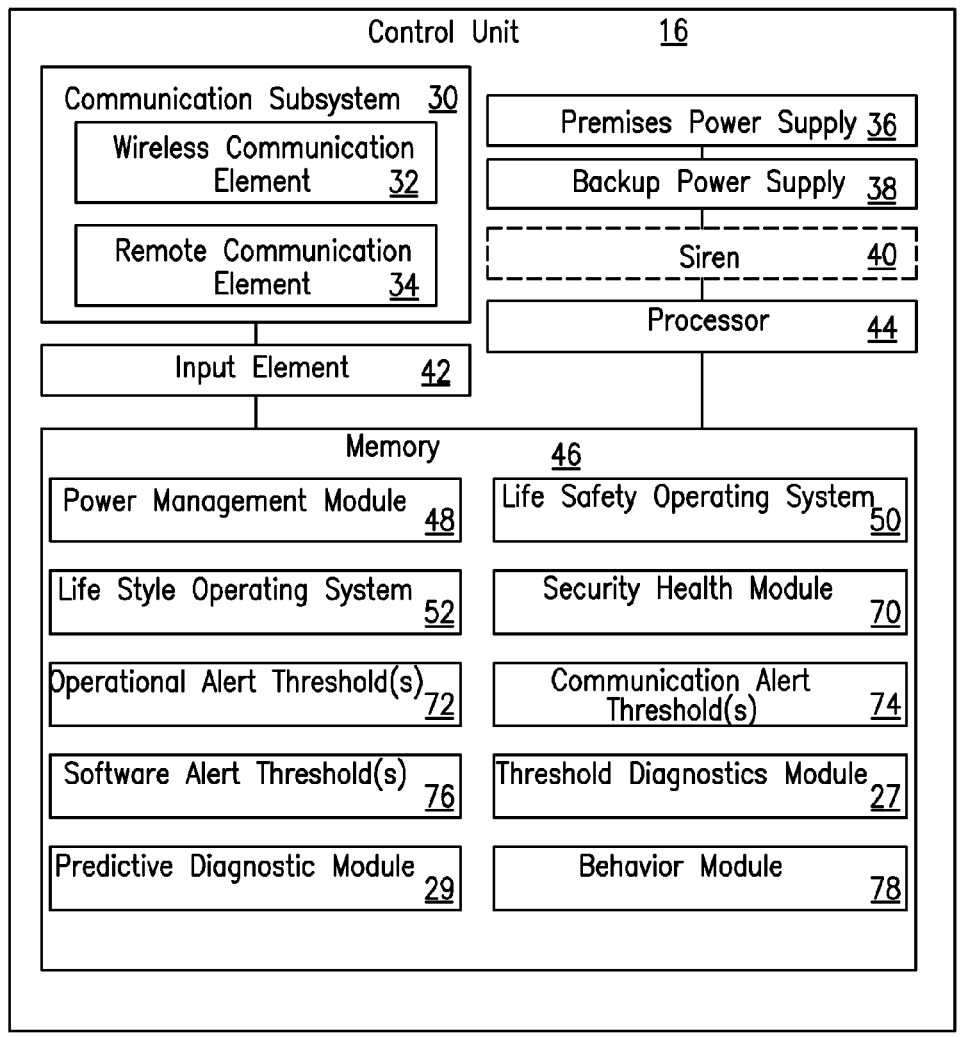
FIG. 2 is a block diagram of a control unit constructed in accordance with the principles of the invention.

An example control unit 16 for managing a premises based system is described with reference to FIG. 2. Control unit 16 may include communication subsystem 30 that is configured to provide communications with user interface device 12, premises device 14 and network 18. In particular, communication subsystem 30 may include wireless communication element 32 and remote communication element 34. Wireless communication element 32 provides wireless communication with user interface device 12 and premises device 14. Wireless communication element 32 may support one or more wireless communication protocols such as ZigBee, Z-wave and Wi-Fi, e.g., IEEE 802.11, among others wireless communications protocols that support wireless data transfer.

Wireless communication element 32 may be composed of one or more hardware components in which each hardware component is configured to provide wireless communication using a specific protocol. For example, wireless communication element 32 may include a ZigBee hardware component configured to provide ZigBee based communications and a Z-wave hardware component configured to provide Z-wave based communications. Wireless communication element 32 may include at least one hardware component for at least one other wireless communication protocol. The hardware components associated with wireless communication element 32 may be internal components within control unit 16 such that these features are built-in or standard features. Alternatively, any one or more of the hardware components associated with wireless communication element 32 may be external components that may be replaced by a user, homeowner or installer. For example, the ZigBee and Z-wave hardware component modules may be internal components while the Wi-Fi hardware component may be an external component that allows for upgrading. Wi-Fi may be provided by an internal component. Wireless communication element 32 may broadcast a wireless signal so that user interface device 12 may connect directly to control unit 16. For example, wireless communication element 32 may provide a Wi-Fi encrypted service set identifier (SSID) and path for communication with multiple user interface devices 12.

By supporting a plurality of wireless communication protocols, wireless communication element 32 enables control unit 16 to be used with a variety of user interface devices 12 and premises devices 12 that are designed to work using only a specific wireless communication protocol. Supporting a plurality of wireless communication protocols allows easy upgrading of existing user interface device 12 and premises device 14, and for control unit 16 integration with various equipment venders that may incorporate different wireless protocols. Wireless communication element 32 may provide two-way voice communication with user interface device 12, which is then communicated with remote monitoring center 20. For example, wireless communication element 32 may support voice over internet protocol (VoIP) based communications. In one embodiment, component parts of wireless communication element 32, e.g., an IEEE 802.11 communication module, may also be past of remote communication element so that the wireless communication protocols, e.g., IEEE 802.11 protocols, can be used to communicate with remote monitoring center 20. In other words, one or more specific communication modules of wireless communication element 32 can also be part of remote communication element 34.

Remote communication element 34 is configured to provide broadband communications with remote monitoring center 20 via network 18. For example, remote communication element 34 may be an Ethernet based hardware component that provides communication with network 18. Alternatively or in addition to Ethernet based hardware component, remote communication element 34 may include a Wi-Fi (IEEE 802.11) hardware component that provides communication with a home or other premises network, e.g., a home wireless network, and may utilize some of the same components as wireless communication element 32. The remote communication element 34 may also include a cellular radio hardware component that provides communications with at least one cellular network such as an LTE based cellular network. Control unit 16 may use Ethernet communication link 26 as a primary communication link such that the cellular communication link is used for broadband communications when the Ethernet or primary communication link is not functioning properly such as during a power outage where a home network is unavailable, i.e., home network router has no power.

Control unit 16 may include premises power supply 36 that is configured to provide power to control unit 16. For example, premises power supply 36 may provide power to control unit 16 via a home alternating current (AC) power outlet or other power outlets that are known in the art. Premises power supply 36 may be a primary power supply such that control unit 16 operates using power from the premises power supply 36 when available. Control unit 16 may also include back-up power supply 38 that provides power during premises power supply failure. Back-up power supply 38 may include one or more disposable or rechargeable batteries that are configured to provide enough power to operate control unit 16 for first predetermined amount of time and activate siren 40 for a second predetermined amount of time, e.g., a user can access the premises based system for at least twenty-four hours while control unit 16 is power by back-up power supply 38 while the siren can be activated and operate after the twenty-four hour period.

Siren 40 may be an eighty-five decibel (dB) siren, among other audible devices known in the art. Siren 40 may be an optional component in control unit 16 such that audible alerts are generated by user interface device 12, e.g., portable control keypad/interface 12a, and not control unit 16. Moreover, control unit 16 may include at least one universal serial bus port (USB) to receive power from a laptop or other device with a USB interface. Other port types capable of providing power to control unit 16 may be used based on design need.

Input element 42 may be configured to receive input data from a user. For example, input element 42 may be a ten number keypad that enables a user to arm and disarm system 10. Input element 42 allows for an alternative or back-up way of arming and disarming system when no user interface device 12 is available to a user. Other input elements may be used as are known in the art. Control unit 16 may include one or more indicators such as light emitting diodes (LEDs) that may indicate the status of control unit 16. For example, a first LED is turned on when control panel is powered, a second LED is turned on when the system is armed or disarmed, a third LED is turned on when an internet protocol connection is connected, a fourth LED may be turned on when the cellular connection has sufficient strength and the first LED may flash during low power conditions, among other LED and LED on/off may be used based on design need. Processor 44 may be a central processing unit (CPU) that executes computer program instructions stored in memory 46 to perform the functions described herein.

Memory 46 may include non-volatile and volatile memory. For example, non-volatile memory may include a hard drive, memory stick, flash memory and the like. Also, volatile memory may include random access memory and others known in the art. Memory 46 may store power management module 48, life safety operating system 50 and life style operating system 52, among other data and/or modules. Power management module 48 includes instructions, which when executed by processor 44, causes processor 44 to perform the process described herein, such as the power management process, discussed in detail with reference to FIG. 5. Life safety operating system is configured to provide life safety features associated with system 10. Life style operating system 52 is configured to provide life style features associated with system 10. In particular, processor 44 is configured to run both life safety operating system 50 and life style operating system 52 such that separate processors are not needed to run both operating systems. This single processor configuration reduces cost while still providing both life safety and life style features.

Figure 7:
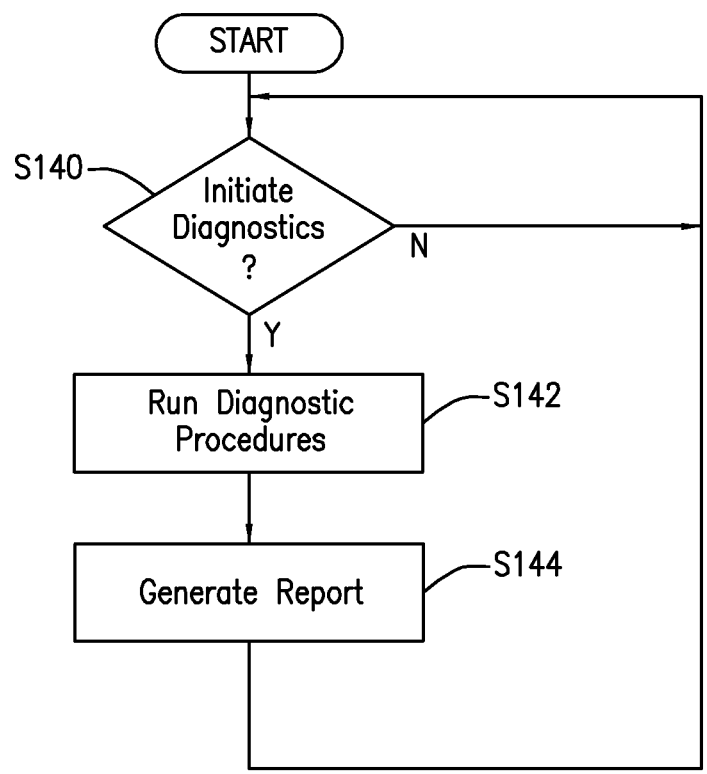
FIG. 7 is a flow chart of an example diagnostic process of the invention in accordance with the principles of the invention.

Memory 46 may include system health module 70 in which system health module 70 includes instructions, which when executed by processor 44, causes processor 44 to perform the process described herein with respect to FIG. 7, such as initiating the threshold diagnostics process, discussed in detail with reference to FIG. 8, and/or initiating the predictive diagnostics process, discussed in detail with response to FIG. 9. Memory 46 may also include one or more operational alert thresholds 72, communication alert thresholds 74 and software alert thresholds 76, among other predefined thresholds that may be used to determine potential or current system 10 issues/problems, as discussed in detail with respect to FIG. 8. Memory 46 may also include threshold diagnostics module 78 in which threshold diagnostics module 78 includes instructions, which when executed by processor 44, causes processor 44 to perform the threshold diagnostic process, discussed in detail with respect to FIG. 8. Memory 46 may also include predictive diagnostics module 80 in which predictive diagnostics module 80 includes instructions, which when executed by processor 44, causes processor 44 to perform the predictive diagnostic process, discussed in detail with respect to FIG. 9. Memory 46 may also include behavior module 82 in which behavior module 82 includes instructions, which when executed by processor 44, causes processor 44 to perform the process described herein, such as initiating the threshold diagnostic process and/or predictive diagnostic process, discussed in detail with respect to FIG. 10.

Memory 46 may include a Wi-Fi high-jacking module 84 that varies control unit 16 settings when processor determines an unauthorized has connected to control unit 16 via Wi-Fi. For example, Wi-Fi high-jacking module 84 may shutdown Wi-Fi and/or move to low power RF such that user interface device 12 and/or premises device 14 can still communicate with control panel. Memory 46 may include an auto enrollment module 86 that is configured to cause processor 44 to search, wirelessly, for user interface devices 12 and premises devices 14 located within or near the premises, i.e., discover devices. The auto enrollment module 86 may cause processor 44 to forward information associated with the discovered devices 12 and 14 to remote monitoring center 20 such that remote monitoring center 20 may push enrollment data to control unit 16 to facilitate configuration. Enrollment data may include data for configuring discovered devices 12/14 to work with control unit 16. Control unit 16 may use the enrollment data to configure the premises based system such that the system operates using at least one discovered device 12 and/or 14. Auto enrollment module 86 reduces installation time as the devices 12 and/14 are automatically found and enrolled for use by control unit 16.

Figure 3:
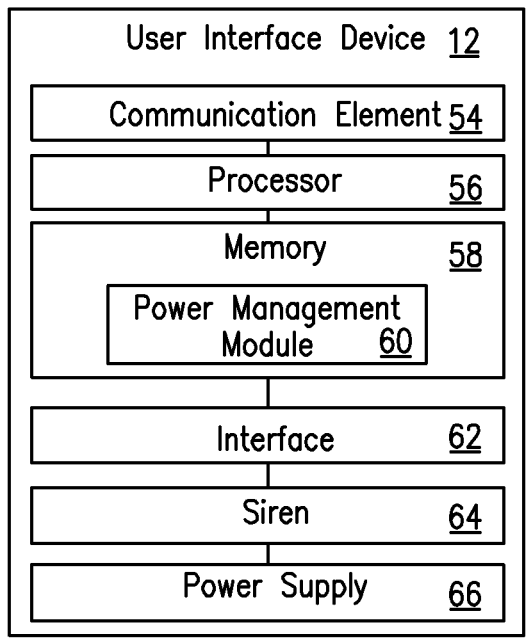
FIG. 3 is a block diagram of a user interface device constructed in accordance with the principles of the invention.

An example user interface device 12 for providing local control and configuration data is described with reference to FIG. 3. User interface device 12 may include a portable control keypad/interface 12a, personal computer 12b, mobile device 12c and tablet computer 12n, among other devices. User interface device 12 includes communication element 54 that is configured to communicate with control unit 16 via at least one wireless communication protocol such as ZigBee, Z-wave and Wi-Fi, among other protocols known in the art. User interface device 12 may include processor 56 and memory 58 that correspond to control unit 16 components, with size and performance being adjusted based on design need. Processor 56 performs the functions described herein with respect to user interface device 12.

Figure 6:
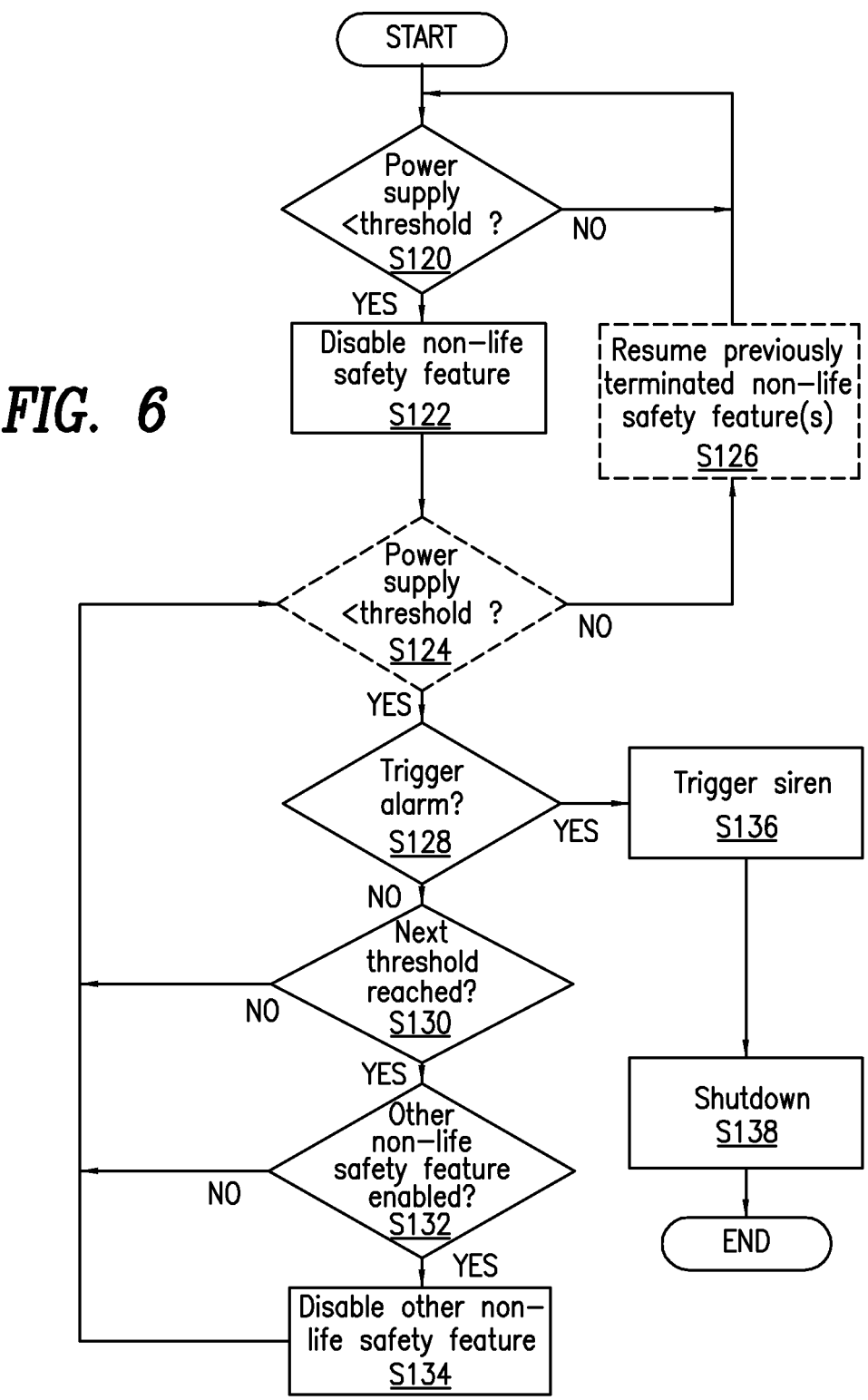
FIG. 6 is a flow chart of an example user interface device power management process of the invention in accordance with the principles of the invention.

Memory 58 may include power management module 60 in which power management module 60 includes instructions, which when executed by processor 56, causes processor 56 to perform the process described herein, such as the power management process, discussed with respect to FIG. 6. Memory 58 may store other modules and data based on design need. Interface 62 may be user interface configured to receive user inputs. For example, interface 62 may receive local control and configuration data input from user.

User interface device 12 may include siren 64 such as an eighty-five dB siren or other audible device(s) known in the art. User interface device 12 may include power supply 66 for supplying power to user interface device 12. Power supply 66 may include one or more rechargeable and/or disposable batteries, among other types of batteries that are well known in the art. Moreover, user interface device 12 may be powered via a universal serial bus (USB), have an interface that allows the connection of an external power adapter/recharger, and/or other connection type.

Figure 4:
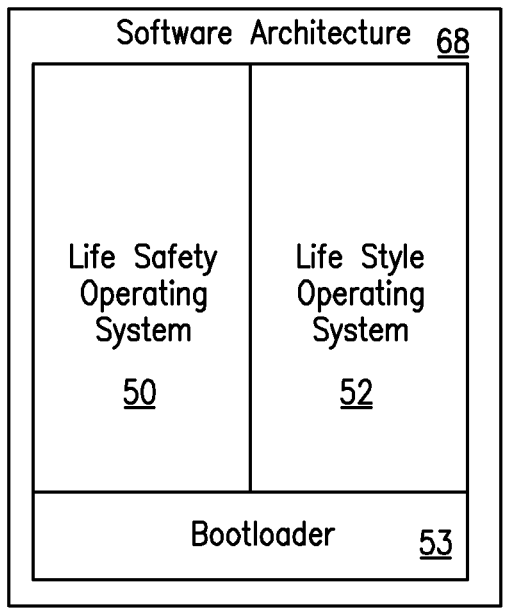
FIG. 4 is a block diagram of a software architecture of the control unit, constructed in accordance with the principles of the invention.

Example software architecture 68 of control unit 16 is described with reference to FIG. 4. In particular, software architecture 68 may include life safety operating system 50, life style operating system 52 and bootloader 53, among other software components relates to premises based feature management and operation of control unit 16. Life safety operating system 50 and life style operating system 52 are configured to run in control unit 16 in which the life safety operating system 50 and life style operating system 52 run in a virtual machine configuration. The virtual machine configuration allows a single processor such as processor 44 to separately run the life safety operating system 50 while updating life style operating 52 without negatively affecting features associated with life safety operating system 50, i.e., life safety features remain functioning while life style features are updated. The converse is also contemplated. Bootloader 53 is used to load the run time environment for operating systems 50 and 52.

Figure 5:
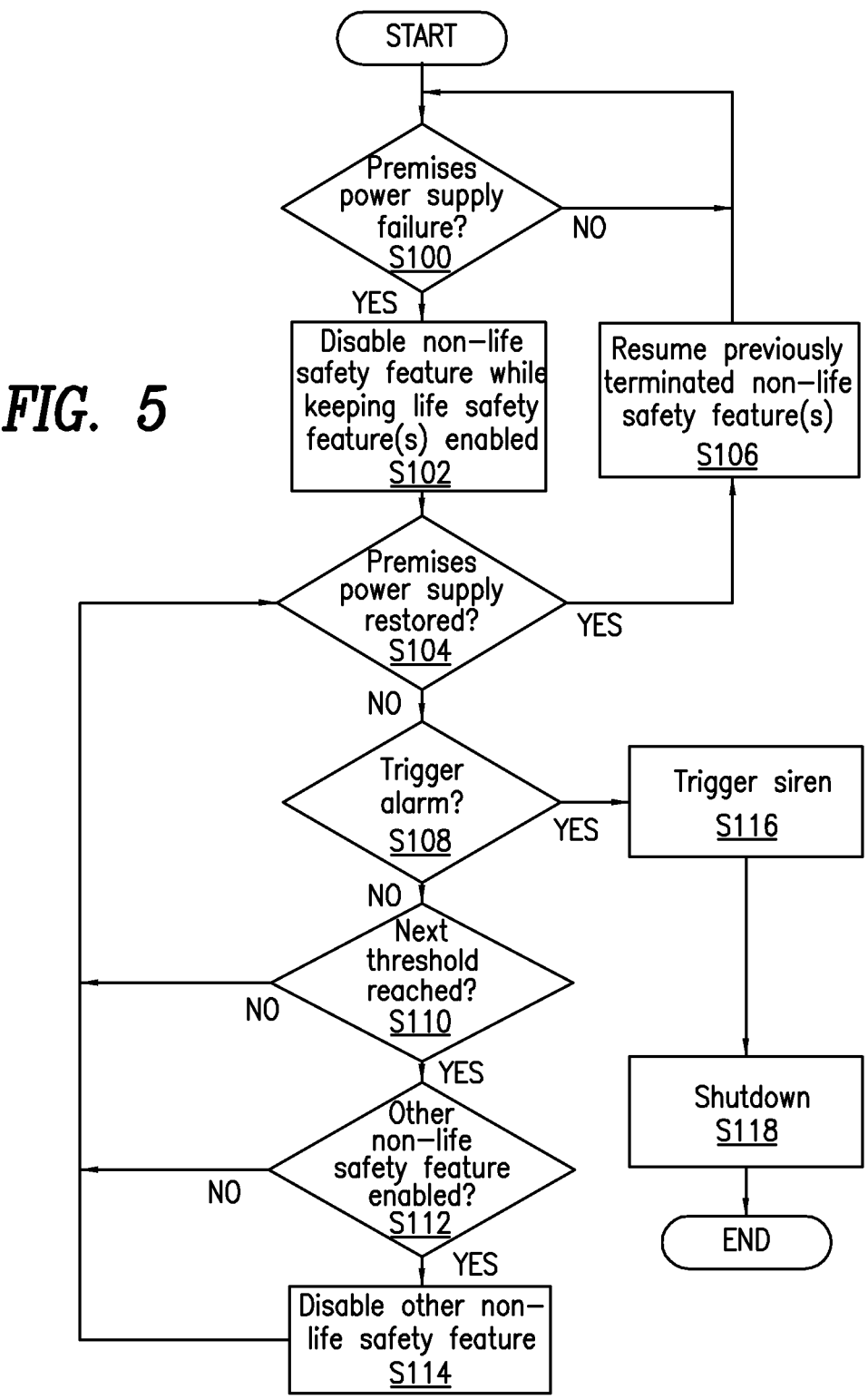
FIG. 5 is a flow chart of an example control unit power management process of the invention in accordance with the principles of the invention.

An example power management process is illustrated in FIG. 5. The power management process relates to managing a premises based system based at least in part on the monitoring of premises power supply 36 and back-up power supply 38. Processor 44 determines whether premises power supply 36 has failed (Block S100). For example, processor 44 may monitor the power being provided by premises power supply 36 using well known methods in the art to determine whether power failure has occurred. Power failure may occur when the voltage being supplied by premises power supply 36 falls below a predefined voltage threshold. If processor 44 determines a power failure has not occurred, the determination of Block S100 may be repeated.

If the determination is made that premises power supply 36 is in a power failure condition, processor 44 disables a non-life safety feature such as a life style feature, while keeping the life safety feature(s) enabled (Block S102). For example, the temperature control feature associated with the life style operating system may be disabled while keeping the intrusion detection, fire detection and carbon monoxide detection features associated with life safety operating system 50 enabled. Power management module 48 advantageously allows non-life safety features such as life style features associated with life style operating system 50 to be disabled without interrupting life safety features associated with life safety operating system 52. This configuration helps ensure life safety features will remain enabled during premises power supply 36 failure while at the same time reducing power consumed by disabling a non-life style feature. For example, some life style features may require or attempt to initiate communication with user interface device 12 and/or remote monitoring center 20 in which such communications consume power, i.e., may consume limited back-up power. Other non-life style features that may be disabled include turning off any control device LEDs and/or terminating communications to user interface device 12 while maintaining communications with premises devices. Therefore, disabling at least one non-life safety feature reduces the amount of power consumed by control unit 16 in which the more non-life safety features that are disabled, the greater the power savings.

Processor 44 determines whether premises power supply 36 has been restored based at least in part on the monitoring of premises power supply 36 (Block S104). For example, processor 44 may continually or periodically monitor the power level of premises power supply 36 to determine whether the power level is equal to or above the predetermined voltage threshold. If processor 44 determines premises power supply 36 has been restored, processor 44 may resume or enable the previously disabled non-life safety feature(s) (Block S106). In other words, the power management process enables non-life safety features such as life style features that may consume more power once control device 16 is being power by premises power supply 36 such that the non-life safety features consume minimal power from the back-up power supply 38.

If the determination is made that power of premises power supply 36 has not been restored, a determination is made whether to trigger an alarm such as an audible alarm (Block S108). In particular, an audible alarm may be trigger after processor 44 determines control unit 16 has been operating on back-up power supply 38 for a predetermined amount of time, e.g., twenty-four hours. The predetermined amount of time may be based on design need and/or regulatory requirements. If the determination is made to trigger an alarm, siren 40 or siren 64 may be triggered for a predetermined amount of time (Block S116). In one embodiment, processor 44 uses communication subsystem 30 to send a siren trigger message to user interface device 12 to trigger siren 64 in user interface device 12. For example, siren 64 may be triggered for at least four minutes in order to alert a user of a control unit 16 status such as loss of all power. The predetermined amount of time the alarm is triggered may be based on design need and/or regulatory requirements. Other criteria may be used to trigger an audible alarm based on design need. After triggering siren 64, control unit 16 may shut down (Block S118). For example, control unit 16 may perform a graceful shutdown according to a shutdown routine when the back-up power supply 38 reaches a predefined threshold such as ten percent power remaining.

Referring back to Block S108, if processor 44 makes the determination not to trigger an alarm, processor 44 determines whether an available power threshold has been reached (Block S110). The power threshold may correspond to a back-up power supply 38 level at which another non-life safety feature may be shutdown in order to reduce power consumption. For example, a different non-life safety feature may be terminated every time the power level falls by a predetermined amount such as five or ten percent or to a predetermined level. Moreover, one or more non-life safety features may be terminated at a time. If the determination is made that the feature threshold is not reached, the determination of Block S104 may be repeated.

If the determination is made that the power threshold has been reached, processor 44 determines whether at least one other non-life safety feature, e.g., life style feature, is enabled (Block S112). For example, a lighting life style feature may have been previously been disabled in Block S102 but a temperature life style feature remains enabled. If the determination is made that at least one other non-life safety feature is not enabled, the determination of Block S104 may be repeated. If processor 44 determines at least one other non-life safety feature is enabled, processor 44 disables the at least one other non-life safety feature such that the non-life safety features consume less power from the back-up power supply 38 (Block S114). The order of which non-life safety features are disabled may vary based on design need and power consumption of individual features or other criteria. After disabling the at least one other non-life safety feature, the determination of Block S104 may be repeated. The power management process helps ensure more important or safety-dependent features stay powered by terminating or disabling less important features such as life style features. Alternatively, processor 44 may disable more than one or all non-life safety features at one time.

An example power management process for user interface device 12 is illustrated in FIG. 6. The power management process relates to managing user interface device 12 features based at least in part on the monitoring of power supply 66. For example, processor 56 may monitor the power being provided by power supply 66 using well known methods in the art. Processor 56 determines whether the power being supplied by power supply 66 drops below a predefined threshold based at least in part on the monitoring, i.e., whether a power supply 66 voltage or power level is less than a threshold (Block S120). The threshold may be a power and/or voltage level determined based on design need and/or other factors. If processor 56 determines power supply 66 is not below, i.e., greater than or equal to, a predetermined threshold, the determination of Block S120 may be repeated.

If the determination is made that the power supply 66 is below the predetermined threshold, processor 56 disables at least one non-safety feature while keeping life safety feature(s) enabled at user interface device 12 (Block S122). For example, processor 56 may disable a life style feature such that less power may be consumed by not having to perform processing, communication and/or other functions associated with the disabled feature. Other non-safety features may include a backlight keypad and/or display feature. Therefore, disabling at least one non-life safety feature reduces the amount of power consumed by user interface device 12 such that the more non-safety features that are disabled, the greater the power savings.

After at least one non-life safety has been disabled, processor 56 may determine whether power supply 66 is still below the threshold based at least in part on the monitoring (Block S124). For example, processor 56 may continually or periodically monitor the voltage level of power supply 66. If the determination is made that power supply 66 is not below the threshold (i.e., is greater than or equal to the threshold), processor 56 may resume the previously disabled or terminated non-safety feature(s) (Block S126). In other words, the power management process of FIG. 6 enables or executes the previously disabled non-life safety feature(s) that may consume more power once power supply 66 is greater than or equal to the threshold such that the non-life safety features consume minimal power from power supply 66. Power supply 66 may rise back to the predetermined threshold level when power supply 66 is being recharged and/or when user interface device 12 is being power via USB, among other situations where power supply 66 is no longer below the predetermined threshold. Alternatively, Blocks S124 and S126 may be skipped or excluded from the power management process of FIG. 6 based on design need, i.e., the process moves from Block S122 directly to Block S128.

If the determination is made that power supply 66 is below threshold, processor 56 determines whether to trigger an alarm such as an audible alarm (Block S128). In particular, an audible alarm may be trigger after processor 56 determines power supply 66 has reached a lower predetermined threshold. For example, the lower predetermined threshold may correspond to a minimum power level needed to trigger siren 64 for a predetermined amount of time and/or shutdown user interface device 12. The lower predetermined threshold may be based on design need. If the determination is made to trigger an alarm, siren 64 and/or siren 40 may be triggered for a predetermined amount of time (Block S136). For example, siren 64 may be triggered for at least four minutes in order to alert a user of user interface device 12 status such as a loss of all power status. The predetermined amount of time the alarm is triggered may be based on design need and/or regulatory requirements. Other criteria may be used to trigger an audible alarm based on design need. After triggering siren 64, user interface device 12 may shut down (Block S138). For example, control unit 16 may perform a graceful shutdown according to a shutdown routine.

Referring back to Block S128, if the determination is made not to trigger an alarm, processor 56 determines whether a feature threshold has been reached (Block S130). The feature threshold may correspond to a back-up power supply 38 level at which another feature may be shutdown in order to reduce power consumption. For example, a difference feature may be terminated every time the power level fails another predetermined amount, e.g., five or ten percent. Moreover, more than one feature may be disabled or terminated at a time. If the determination is made that the feature threshold is not reached, the determination of Step S124 may be repeated. Alternatively, if Block S124 is skipped or excluded from the process and the determination is made that the feature threshold not been reached, the determination of Block S128 may be performed.

If the determination is made that the feature threshold is reach, processor 56 determines whether at least one other non-life safety feature is enabled (Block S132). If the determination is made that at least one other non-life safety feature is not enabled, the determination of Block S124 may be repeated. Alternatively, if Block S124 is skipped or excluded from the process and the determination is made that at least one other non-life-style feature is not enabled, the determination of Block S128 may be repeated, i.e., the process moves from Block S132 to Block S128. If processor 56 determines at least one other non-life safety feature is enabled, processor 56 disables the at least one other life style feature such that the non-life safety features consume less power from power supply 66 (Block S134). The order of which non-life safety features are disabled may vary based on design need and power consumption of individual features or other criteria.

After disabling the at least one other non-life style feature, the determination of Block S124 may be repeated. Alternatively, if Block S124 is skipped or excluded from the process and the other non-life safety feature has been disabled at Block S134, the determination of Block S128 may be repeated, i.e., the process moves from Block S134 to Block S128. The power management process helps ensure more important or safety dependent features remain operating by terminating or disabling less important features such as life style features or other non-safety features at user interface device 12. Alternatively, processor 56 may disable more than one or all life style features at one time. In one embodiment, the power management is configured and power supply 66 sized such that processor 56 can still trigger and sound siren 64 for four minutes after a twenty-four hour period upon the occurrence of a triggering condition, e.g., low battery, sensor trigger detection, receipt of trigger message from control unit 16, etc.

An example system health process of health module 70 is described with reference to FIG. 7. Processor 44 determines whether to initiate diagnostics (Block S140). For example, processor 44 may determine to initiate diagnostics, e.g., threshold diagnostics and/or predictive diagnostics, at predetermined intervals and/or may initiate diagnostics upon receipt of a command to run diagnostics. In another example, processor 44 may determine to initiate diagnostics upon request by an on-site technician, upon power up of control unit and/or at least one premises device or may periodically initiate diagnostics. The command may be transmitted from user interface 12, premises device 14 and/or remote monitoring center 20. Further, the command may indicate whether to initiate threshold diagnostics and/or predictive diagnostics. If processor 44 determines not to initiate diagnostics, processor 44 may loop and periodically perform the determination of Block S140. For example, the diagnostic procedure for monitoring system health may be periodically repeated or may be continuous using a programmatic subroutine embedded within the general operating software.

If processor 44 determines to initiate diagnostics, processor 44 runs diagnostics procedures (Block S142). For example, processor 44 may initiate the threshold diagnostic process of threshold diagnostic module 78 and/or predictive diagnostic process of predictive diagnostic module 80, discussed in detail with respect to FIGS. 8 and 9, respectively. Further, processor 44 may initiate other diagnostic procedures for determining the health of user device 12, premises device 14 and/or control unit 16.

Processor 44 may generate a report with the results of the diagnostics procedures (Block S144). The report may contain details on one or more alerts that were generated, as discussed in detail below, the one or more devices 12/14 and/or control unit 16 that have and/or may have health issues, functionality of system 10 has and/or may have health issues, among other data that indicates whether one or more devices and/or functions of a premises based system are operating and/or will continue to operate. The report and metrics included in the report may be stored in memory 46 for further later comparison with an updated report by control unit 16, i.e., control unit 16 tracks a health history of the premises based system to identity persistent problems and problems that have been fixed. The report may be transmitted to user interface device 12 and/or remote monitoring center 20, among to other devices, servers and/or users. For example, an on-site technician may review the report in order to trouble shoot system issues. In another example, a remote monitoring center may dispatch an on-site technician based on the report received from control unit 16.

Figure 8:
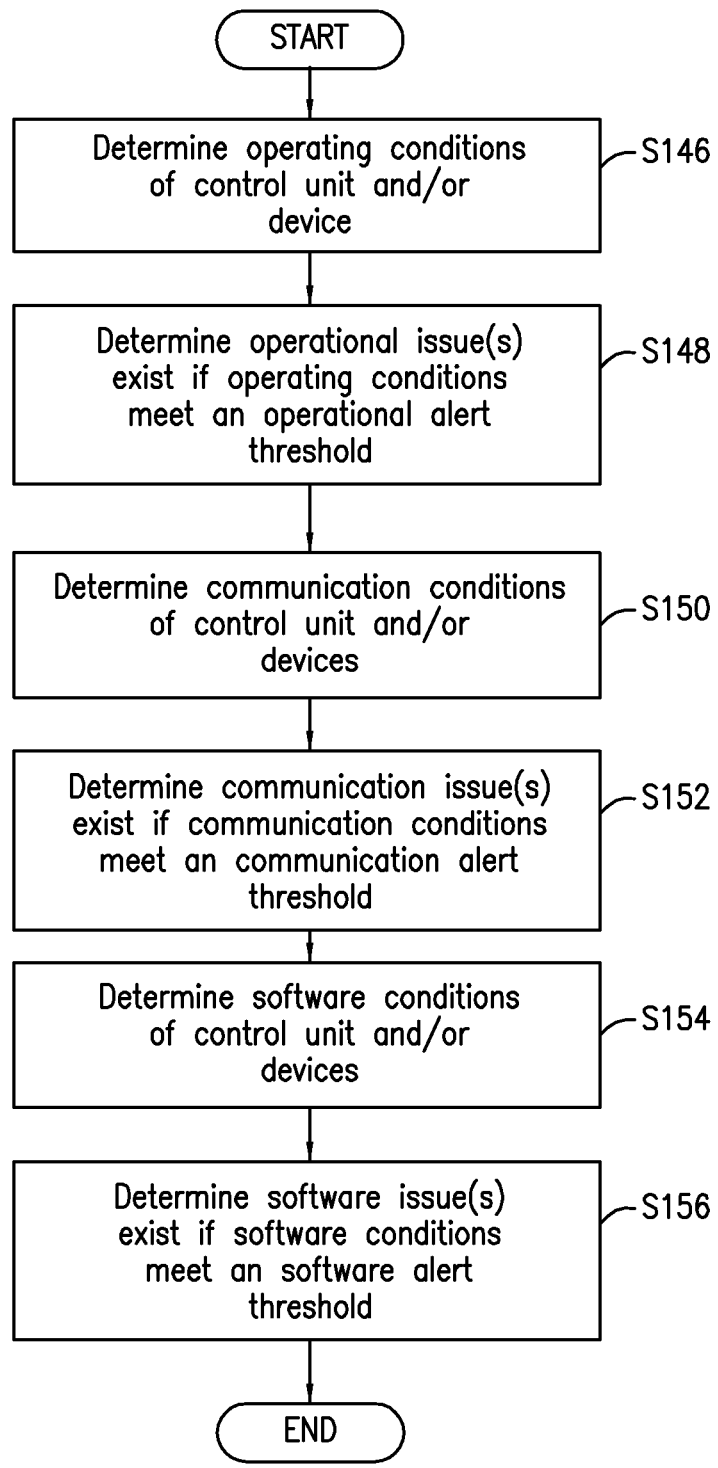
FIG. 8 is a flow chart of an example threshold diagnostic process in accordance with the principles of the invention.
Figure 9:
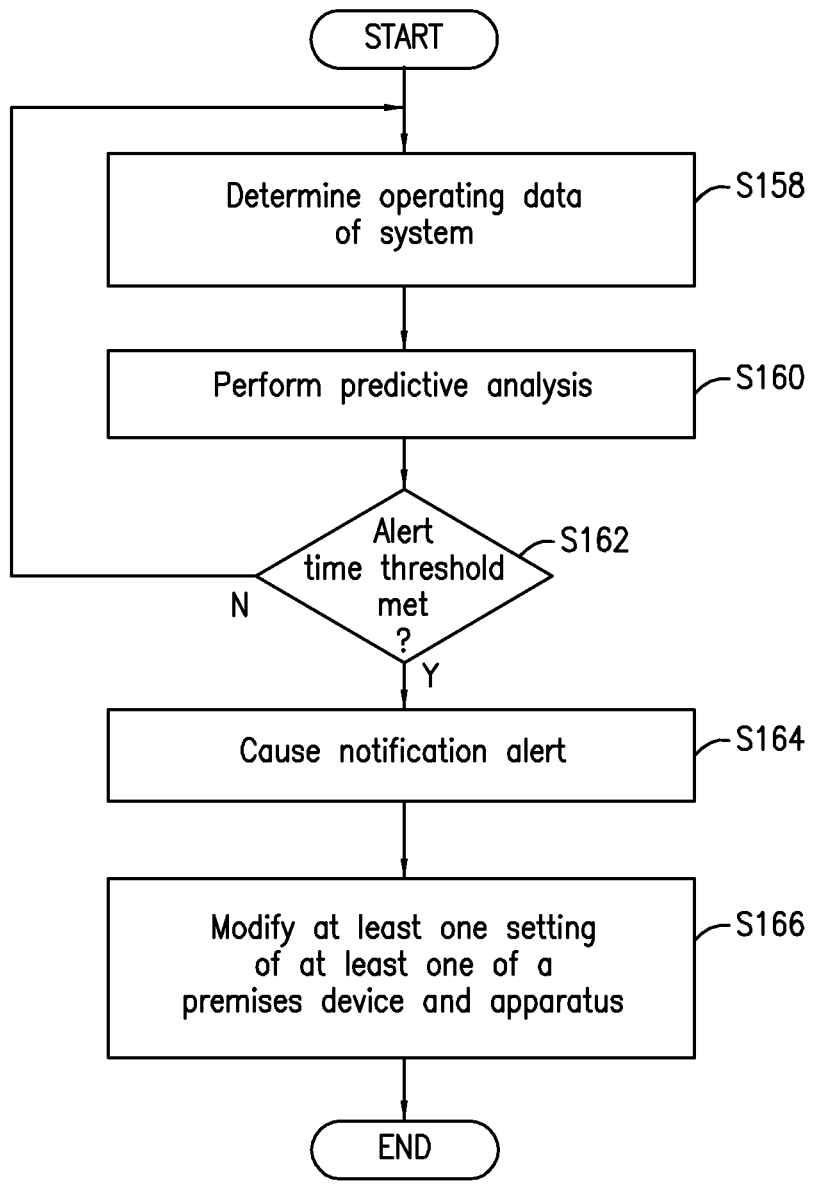
FIG. 9 is a flow chart of an example predictive diagnostics process in accordance with the principles of the invention.

An example threshold diagnostic procedure of threshold diagnostic module 78 is illustrated in FIG. 8. Processor 44 determines the operating conditions of control unit 16 (Block S146). Optionally, processor 44 may also determine the operating conditions of at least one other device, e.g., user interface device 12 and/or premises device 14. For example, processor 44 determines control unit 16 and devices 12 and 14 current battery levels and battery degradation, i.e., history of battery health over 30, 60 and/or 90 days. Processor 44 determines that at least one operational issue exists if the operating conditions meet operational alert threshold(s) 72 (Block S148). Operational alert thresholds include one or more predefined thresholds that indicate, when met, that system 10 currently has at least one hardware issue/problem or will have at least one hardware issue/problem if the operational conditions persist.

In one embodiment, control unit 16 may store predefined system health requirements or operational alert thresholds relate to control unit 16 and other devices in the system. The predefined health system requirements may include a threshold alternating current (AC) power status, threshold current battery level, history (30, 60, 90 days) battery level, threshold Wi-Fi network status, threshold receive signal strength indicator level (RSSI) of Wi-Fi enabled device, threshold cellular radio current status, threshold current cellular radio RSSI level, threshold history (day of install and 30 days) of cellular radio RSSI level, required IP connection status, threshold IP upload/download speed, threshold IP connection history, threshold current IP speed, threshold history of IP connection speed, life safety device (i.e., premises device 14) threshold current status, threshold current average RSSI of life style device and threshold history of average RSSI of life style device. The predefined health system requirements may also include threshold life safety device (i.e., premises device 14) loop status, threshold RSSI of life safety device, threshold current battery status of life safety device, threshold history of life safety device battery level control panel 12*a* threshold current and history battery level, control panel 12*a* threshold current and history Wi-Fi signal level.

For example, an operational alert threshold may be a minimum current battery level and/or minimum battery degradation level. Another example of an operational alert threshold may include a minimum alternating current power level at control unit 16. System health module 70 is also arranged to monitor and determine the state of the operational software. For example, system health module 70 can monitor the software to determine whether any subsystems or modules are not functioning properly or have been deactivated. In one embodiment, system health module 70 can determine whether any lifestyle or live safety functions have been deactivated, such as might occur during a power outage. System health module 70 an also determine whether any software modules that should be reactivated have been.

Processor 44 determines communication conditions of control unit 16, user interface device 12 and/or premises device 14 (Block S150). For example, communication conditions may include Wi-Fi network statuses and signal level of control unit 16, cellular radio status and signal level of control unit 16, internet protocol connection status and speed of control unit 16. The statuses and signal levels may be current and/or a tracked history of these status and signal levels such that processor can perform predicative analysis to determine when in the future a hardware component will fail. Communication conditions may also include a received signal strength indication (RSSI) value and/or loop status of premises device 14.

Processor 44 determines communication issues exist if communication conditions meet a communication alert threshold 74 (Block S152). Communication alert threshold 74 includes one or more predefined thresholds that indicate, when met, system 10 has at least one communications issue/problem or will have at least one communication issue/problem is the communication condition persist. For example, communication alert threshold 74 may include a minimum signal level, status and/or communication speed. Communication alert may also include a minimum RSSI value and/or loop status, among other minimum levels, values and/or status. Furthermore, the statuses and signal levels may be current and/or a tracked history of these status and signal levels such that processor 44 can perform predictive analysis.

Processor 44 determines software conditions of control unit 16, at least one user interface device 12 and/or at least one premises device 14 (Block S154). For example, processor 44 may determine the firmware version of control unit 16 and/or at least one premises device 14. Processor 44 may determine other software related conditions of control unit 16 and/or at least one premises device 14. Processor 44 determines software issue(s) exist if software conditions meet at least one software alert threshold 76 (Block S156). Software alert threshold 76 includes one or more predefined thresholds that indicate, when met, system 10 has at least one software issue/problem. For example, software alert threshold 76 may include minimum firmware versions for control unit 16 and/or at least one premises device 14. Furthermore, a user may use user interface device 12 or other device capable of communicating with control unit 16 to view the Wi-Fi network signal strength, by device, including current signal strength, and history of signal strength over time. Furthermore, the user or installer may view ZigBee and Z-wave network health, by device, including current signal strength, and a history of signal strength over time. Although certain examples of what may be diagnostically monitored are provided, the invention is not limited to such. Further the order of Blocks S152-S156 is not limited to the order shown in FIG. 8 and may be performed in a different order based on design need. Further, one or more Blocks may be skipped or omitted from FIG. 8 based on design need, e.g., Blocks S154 and S156 may be skipped or omitted.

Processor 44 determines whether an issue exists, e.g., operational issue, communication issue and/or software issue (Block S158). If processor determines an issue exists, processor 44 may cause a notification alert to be transmitted (Block S160). The notification alert may be transmitted to user interface device 12 and/or remote monitoring center 20 and may indicate the one or more issues that were determined. After the notification alert is transmitted, processor 44 may optionally modify at least one setting of premises based system 10 such as a one or more premises device 14 settings and/or user device 12 settings, among one or more settings of other components in premises based system 10 (Block S162). Referring back to Block S158, if processor 44 determines an issue does not exist, processor 44 may end the threshold diagnostic procedure. While Blocks S146-S162 are illustrated in a particular order, the determination of one or more of these Block may be performed in a different order based on design choice. Further, Blocks S158-162 may be performed after the determinations of Blocks S148 and S152.

An example predictive diagnostic procedure of predictive diagnostic module 80 is described with reference to FIG. 9. Processor 44 determines operational data of premises based system 10 (Block S164). For example, processor 44 may determine operating data of control unit 16, at least one other device, e.g., user interface device 12 and/or premises device 14. In on example, operational data may include control unit 16 and/or devices 12 and/or 14 current battery levels and battery degradation, i.e., history of battery health over 30, 60 and/or 90 days. The operational data may include at least one of an alternating current power level, Wi-Fi signal strength level, received signal strength level and battery level. In other example, operational data may include degrading received wireless signal levels of one or more devices 12 and/or 14. Other current and/or past operational data of premises based system 10 may be determined.

Processor 44 performs predictive analysis based at least in part on the operational data, i.e., predictive analysis is performed based at least in part on the received operational data, the predictive analysis indicating whether the at least one of premises device and apparatus is likely to operate within the failure range within a predefined period of time (Block S166). The predictive analysis indicates whether the at least one of premises device 14, user interface device 12, control unit 16 is likely to operate within the failure range within a predefined period of time. The predefined period of time may be an hour, day, week and/or month, among other periods of time set by the user, network operator and/or premises based system company. The predictive analysis may be based at least in part on a history of received operational data, such as predictive analysis using statistical analysis of data aggregated from multiple systems. Non-limiting examples of operational aspects that the parameters can relate to include bandwidth, signal strength of the cellular radios or from premises devices 14, polling information from premises devices 14 (or lack receipt of information thereof), battery strength, primary power consumption, variations in power to the system, temperature proximate the system, etc.

For example, with respect to predicting battery failure, a fully charged battery may be at 13V. Over time, the battery voltage drops, perhaps to 12.8V, then 12.6V, then down to a critical low battery voltage of 10.7V. Therefore using history, if it is determined that the battery voltage drops 0.1V per month, it can be predicted that the voltage will reach the critical low battery threshold in "x" months. Accordingly, it can be predicted when the battery must be replaced. Note this doesn't mean that the prediction is always linear. In some implementations, it might be that the battery voltage drop accelerates over time. Historical data can show this and the changing voltage drop rate can be used in the predictive analysis.

As another example using RF signals, if on the day of system installation a signal is −72 dbm but 6 months later is −88 dbm, the signal value may be acceptable but degrading. For example, the acceptable signal level threshold may be −94 dbm. While RF signals won't slowly degrade like a battery, a periodic but continued degradation is a sign of trouble. If an alarm company should be notified once a signal degrades by 10 dbm, it may be too late once degradation occurs. Accordingly, while some systems may wait for signal level to reach the critical point (−94 dbm in this example), with health monitoring as described herein, the degradation can be determined before a critical level is reached, and a prediction can be made as to when that critical level will be reached.

In one embodiment, with potentially thousands of premises devices 14 reporting signal or battery degradation over time, such as to control unit 16, system 10 can report value changes to a server or remote device, and the server can provide information back to system 10 stating that other systems on average have degraded to critical "y" days, weeks or months later.

By way of non-limiting example, predictive analysis algorithms may be implemented using data logic algorithms, statistical analysis, data analytics, and data manipulation in a manner known to those of ordinary skill in the art. This may include, for example, conventional software based statistical analysis functions, financial functions, time-series functions, text string functions, grouping functions, etc. It could also incorporate software based audio and video analytics capability (and the re-introduction of data outputted from such analytics back into the aforementioned functions). It may also include software based interactive, multi-user variations of these and other tools.

Some data analysis techniques that might be employed also include A/B testing, association rule learning, classification, cluster analysis, crowdsourcing, data fusion and integration, ensemble learning, genetic algorithms, machine learning, natural language processing, neural networks, pattern recognition, anomaly detection, predictive modeling, regression, sentiment analysis, signal processing, supervised and unsupervised learning, simulation, time series analysis and visualization.

Processor 44 may determine whether to cause a notification alert (Block S168). For example, processor 44 may determine whether to cause a notification alert based at least in part on a predetermined alert threshold that indicates an amount of time until one or more user devices 12, premises devices 15 and/or control unit 16 are predicted to fail or be operating in a failure range. The predetermined alert threshold may an hour, day, week and/or month, among other thresholds until one or more user devices 12, premises devices 15 and/or control unit 16 is expected to being operating in a failure range. The predetermined alert threshold may vary depending on device 12 and/or 14 such that the predetermined alert threshold (e.g., one month) for a lifesafety device (e.g., CO and/or smoke sensor) may be met before the predetermined alert threshold (e.g., one week) for a lifestyle device (e.g., light sensor). The predetermined alert threshold for the lifestyle devices may be the same, more and/or less than the predetermined alert for the lifesafety devices. The predetermined alert threshold for the user interface device 12, premises device 14, control unit 16 may be the same, more and/or less than each other.

If processor 44 determines to cause a notification alert based at least in part on at least one predetermined alert time threshold being met, processor 44 causes at least one notification alert to be transmitted, i.e., a notification alert is caused to be transmitted to at least one of a user interface device and remote monitoring center based on the predictive analysis (Block S170). For example, at least notification alert may be transmitted to user interface device 12, premises device 14 and/or remote monitoring center 16 via communication subsystem 30 based on the predictive analysis. The notification alert may indicate the one or more devices, components and/or functions that are predicted to fail. The failure range of the at least one premises device and apparatus includes one of a battery level range, radio frequency signal level range and received signal level range. Processor 44 may optionally modify at least one setting of one or more user devices 12, premises devices 14 and/or control unit 16 based at least in part on the predictive analysis, i.e., processor 44 is configured to modify at least one setting of the at least one premises device and apparatus if the predictive analysis indicates the at least one premises device and apparatus is likely to operate within the failure range within the predefined period of time (Block S172). For example, processor 44 may modify at least one setting of at least premises device 14 (e.g., motion sensor) that is predicted to fail within the predetermined period of time such that the at least one premises device 14 is able to function for a longer period of time.

In another example, the at least one premises device 14 is a sensor device in which the modification of the at least one setting causes the sensor to operate at a lower detection rate. In another example, processor 44 may modify at least one setting of one or more other premises devices 14 in order to compensate for at least one premises device 14 that is predicted to fail. Processor 44 may modify other settings of one or more user devices 12, premises devices 14 and/or control unit 16 based at least in part on the predictive analysis. In another embodiment, processor 44 may determine whether to perform the modification process based on the severity of the predicted failure. For example, if control unit 16 is predicted to fail in 72 hours, i.e., a severe failure, processor 44 may begin disabling features similar to FIGS. 5 and 6. In another example, if premises device 14 such as a motion sensor is predicted to fail in one month, i.e., low severity failure, processor 44 may only issue a notification alert without modifying settings of premises based system 10. Alternatively, processor 44 may skip Block S172 or the modification functionality may be omitted from predictive diagnostic module 80 based on design choice.

Figure 10:
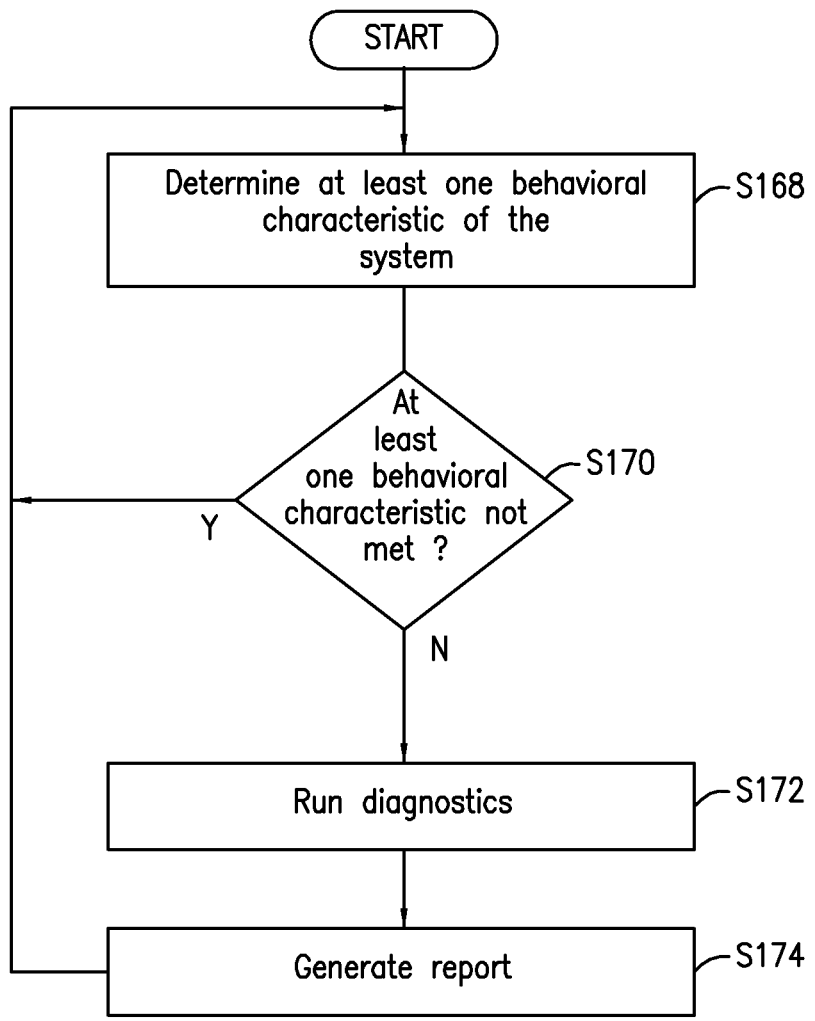
FIG. 10 is a flow chart of an alternative diagnostic process triggered by behavior in accordance with the principles of the invention.

An example behavior process of behavior module 82 for system health diagnostics is described with reference to FIG. 10. Processor 44 determines at least one behavioral characteristics of premises based system 10, e.g., behavioral characteristic of one or more user interface devices 12, one or more premises devices 14 and/or control unit 16 (Block S174). A behavioral characteristic relates to a system operation and/or function that is routinely triggered or armed by a user during a predefined time range and/or on predefined days in the week. For example, processor 44 may determine the premises based system 10 is typically armed from 9 am-5 pm on Monday through Friday. The at least one behavioral characteristic of the premises based system may indicate a window of time when the premises based system is armed by a user. In another example, processor 44 may determine at least one premises device 14 such as door contact sensor and/or electronic door lock is typically armed and/or not triggered during a predetermined time range. Other behavioral characteristics may be determined.

Further, the behavioral characteristics may be determined by processor 44 periodically and/or in response to a triggering event such as a command from remote monitoring center 20 or user interface device 12. Processor 44 determines whether at least one behavior characteristic is met (Block S176). For example, processor 44 may determine whether at least one premises device 14 such as a door contact and/or electronic door lock indicates the door is closed in accordance with the determined behavioral characteristic(s). If processor 44 determines the at least one behavioral characteristic is not met, processor 44 may initiate or run diagnostics procedures (Block S178). In one embodiment, processor 44 may initiate the diagnostic procedure if the at least one behavioral characteristic of the premises based system is not met. For example, processor 44 may initiate the threshold diagnostic process described in FIG. 8 and/or may initiate the predictive diagnostic process described in FIG. 9 in response to determining the at least one behavioral characteristics is not met. After the diagnostics process, processor 44 may generate a report similar to Block S144 (Block S180). Referring back to Block S170, if the at least one behavior characteristic is met, processor 44 may perform the determination of Block S174.

The system health monitoring process of behavioral module 82 may be periodically repeated or may be continuous using a programmatic subroutine embedded within the general operating software.

The invention can be realized in hardware, software, or a combination of hardware and software. Any kind of computing system, or other apparatus adapted for carrying out the methods described herein, is suited to perform the functions described herein. A typical combination of hardware and software could be a specialized or general purpose computer system having one or more processing elements and a computer program stored on a storage medium that, when loaded and executed, controls the computer system such that it carries out the methods described herein. The invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

It will be appreciated by persons skilled in the art that the invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention.

What is claimed is:

1. An apparatus for determining at least one operational condition of a premises based system including at least one premises device, the apparatus comprising:
   a processor, the processor configured to perform a diagnostic procedure, the diagnostic procedure including:
      determining operational data of the premises based system, the operational data indicating at least one of a premises device and the apparatus is operating outside a failure range;
      performing predictive analysis based at least in part on the received operational data, the predictive analysis indicating whether the at least one of premises device and apparatus is likely to operate within the failure range within a predefined period of time; and
      causing a notification alert to be transmitted to at least one of a user interface device and remote monitoring center based on the predictive analysis.

2. The apparatus of claim 1, wherein the failure range of the at least one premises device and apparatus includes one of a battery level range, radio frequency signal level range and received signal level range.

3. The apparatus of claim 1, wherein the processor is further configured to modify at least one setting of the at least one premises device and apparatus if the predictive analysis indicates the at least one premises device and apparatus is likely to operate within the failure range within the predefined period of time.

4. The apparatus of claim 3, wherein the at least one premises device is a sensor device, the modifying at least one setting causing the sensor to operate at a lower detection rate.

5. The apparatus of claim 1, wherein operational data includes at least one of an alternating current power level, Wi-Fi signal strength level, received signal strength level and battery level.

6. The apparatus of claim 1, wherein the predictive analysis is further based at least in part on a history of received operational data.

7. The apparatus of claim 1, wherein the apparatus is a control unit locatable at a premises of a user.

8. The apparatus of claim 1, wherein the processor is further configured to:
   determine at least one behavioral characteristic of the premises based system; and
   initiate the diagnostic procedure if the at least one behavioral characteristic of the premises based system is not met.

9. The apparatus of claim 8, wherein the at least one behavioral characteristic of the premises based system indicates a window of time when the premises based system is armed by a user.

10. The apparatus of claim 1, wherein if the premises device is a lifesafety device, the notification alert being transmitted to the at least the remote monitoring center and the user interface device; and
   if the premises device is a lifestyle device, the notification alert being transmitted to the user interface device.

11. A method for determining at least one operational condition of a premises based system including at least one premises device, the method comprising:
   determining operational data of the premises based system, the operational data indicating at least one of a premises device and the apparatus is operating outside a failure range;
   performing predictive analysis based at least in part on the received operational data, the predictive analysis indicating whether the at least one of premises device and apparatus is likely to operate within the failure range within a predefined period of time; and
   causing a notification alert to be transmitted to at least one of a user interface device and remote monitoring center based on the predictive analysis.

12. The method of claim 11, wherein the failure range of the at least one premises device and apparatus includes one of a battery level range, radio frequency signal level range and received signal level range.

13. The method of claim 11, further comprising modifying at least one setting of the at least one premises device and apparatus if the predictive analysis indicates the at least one premises device and apparatus is likely to operate within the failure range within the predefined period of time.

14. The method of claim 13, wherein the at least one premises device is a sensor device, the modifying at least one setting causing the sensor to operate at a lower detection rate.

15. The method of claim 11, wherein operational data includes at least one of an alternating current power level, Wi-Fi signal strength level, received signal strength level and battery level.

16. The method of claim 11, wherein the predictive analysis is further based at least in part on a history of received operational data.

17. The method of claim 11, further comprising determining at least one behavioral characteristic of the premises based system, the method being initiated if the at least one average behavioral characteristic of the premises based system is not met.

18. The method of claim 17, wherein the at least one behavioral characteristic of the premises based system indicates a window of time when the premises based system is armed by a user.

19. The method of claim 17, wherein if the premises device is a lifesafety device, the notification alert being transmitted to the at least the remote monitoring center and the user interface device; and
   if the premises device is a lifestyle device, the notification alert being transmitted to the user interface device.

20. An apparatus for determining at least one operational condition of a premises based system, the premises based system includes at least one premises device, the apparatus comprising a processor, the processor configured to perform a diagnostic procedure, the diagnostic procedure including:
   determining operational data of the premises based system, the operational data indicating an operating level history of at least one of a premises device and the apparatus;
   performing predictive analysis based at least in part on the operational data, the predictive analysis indicating whether the at least one of premises device and apparatus is likely to operate within a failure range within a predefined period of time;
   causing a notification alert to be transmitted to at least one of a user interface device and remote monitoring center based on the predictive analysis; and
   modifying at least one setting of the at least one premises device and apparatus if the predictive analysis indicates the at least one premises device and apparatus is likely to operate within the failure range within the predefined period of time.

21. The apparatus of claim 20, wherein the failure range of the at least one premises device and apparatus includes one of a battery level range, radio frequency signal level range and received signal level range.

22. The apparatus of claim 20, wherein the at least one premises device is a sensor device, the modifying at least one setting causing the sensor to operate at a lower detection rate.

23. The apparatus of claim 20, wherein the processor is further configured to:
   determine at least one behavioral characteristic of the premises based system; and
   initiate the diagnostic procedure if the at least one behavioral characteristic of the premises based system is not met.

24. The apparatus of claim 23, wherein the at least one behavioral characteristic of the premises based system indicates a window of time when the premises based system is armed by a user.

* * * * *